US 7,325,199 B1

(12) United States Patent
Reid

(10) Patent No.: US 7,325,199 B1
(45) Date of Patent: Jan. 29, 2008

(54) INTEGRATED TIME LINE FOR EDITING

(75) Inventor: Glenn Reid, Woodside, CA (US)

(73) Assignee: Apple Inc., Cupertino, CA (US)

( * ) Notice: Subject to any disclaimer, the term of this patent is extended or adjusted under 35 U.S.C. 154(b) by 394 days.

(21) Appl. No.: 09/680,389

(22) Filed: Oct. 4, 2000

(51) Int. Cl.
*G06F 3/00* (2006.01)
*G06F 3/16* (2006.01)

(52) U.S. Cl. .................. 715/723; 715/719; 715/724; 715/727

(58) Field of Classification Search ............... 345/723, 345/724, 770, 769, 726, 716; 715/723, 719, 715/724, 725, 726
See application file for complete search history.

(56) References Cited

U.S. PATENT DOCUMENTS

| 5,237,648 | A | * | 8/1993 | Mills et al. | 345/723 |
| 5,404,316 | A | * | 4/1995 | Klingler et al. | 345/723 |
| 5,442,744 | A | * | 8/1995 | Piech et al. | 715/500.1 |
| 5,459,832 | A | * | 10/1995 | Wolf et al. | 345/769 |
| 5,659,793 | A | * | 8/1997 | Escobar et al. | 345/835 |
| 5,664,087 | A | * | 9/1997 | Tani et al. | 345/473 |
| 5,682,326 | A | * | 10/1997 | Klingler et al. | 345/723 |
| 5,760,767 | A | * | 6/1998 | Shore et al. | 345/723 |
| 5,786,814 | A | * | 7/1998 | Moran et al. | 345/720 |
| 5,999,173 | A | * | 12/1999 | Ubillos | 345/724 |
| 6,154,600 | A | * | 11/2000 | Newman et al. | 386/4 |
| 6,262,724 | B1 | * | 7/2001 | Crow et al. | 345/723 |
| 6,400,378 | B1 | * | 6/2002 | Snook | 715/716 |
| 6,628,303 | B1 | * | 9/2003 | Foreman et al. | 715/723 |

OTHER PUBLICATIONS

Darrel Plant, Flash 3! Creative Web Animation, 1998, Macromedia Press, 3rd Edition, whole book.*
Macromedia, Flash 4 Using Flash, Jun. 1999, Macromedia Inc. 1st Edition, whole book.*

* cited by examiner

*Primary Examiner*—Weilun Lo
*Assistant Examiner*—Truc T. Chuong
(74) *Attorney, Agent, or Firm*—Blakely, Sokoloff, Taylor & Zafman LLP

(57) ABSTRACT

A method of manipulating a time based stream of information through use of a user interface to generate a presentation is provided in which a processing system is employed. The methods use references to a selected time based stream of information as editing tools. The user interface has functionality to display only a single time line for aligning reference elements to visual time based stream of information. The references may include a variety of edit features that enhance the presentation. Some mechanisms for moving the reference elements on the user interface are drag and drop and/or cut and paste procedures. Other aspects of the present invention relating to the processing system providing convenient user interface and editing tools for use in authoring a presentation of a time based stream of information are also described.

42 Claims, 10 Drawing Sheets

INTEGRATED TIME LINE FOR EDITING

NOTICE OF COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to methods for manipulating a time-based stream of information using a processing system, and more particularly to methods of using a user interface for editing a time based stream of information to create a presentation in a processing system.

BACKGROUND

There are many fields, such as entertainment, academics, business, health care, etc., that utilize media having time based streams of information. These time-based streams of information may be in the form of full motion images, e.g. video and movies; audio, e.g. music, sound effects, and voice/narration; motion graphics, e.g. animation; still images, e.g. text, pictures; and combinations thereof. The information is usually comprised of a stream of individual units, e.g. frames or blocks. Frequently, this information is in a digital format and resides on any of a number of conventional electronic mediums.

Oftentimes, the time-based information is assembled into a presentation through the use of a processing system to edit the information. For example, a video may be edited and combined with audio, text, effects and/or graphics to create a presentation. A "presentation" is any changed version of an original time-based stream of information or a modified copy of the original information. In addition, a "presentation" also may further be defined by at least one instruction for representing the original information in a changed form. In such an instruction-based presentation, the information is communicated in the manner according to the instruction. For instance, a software program may include directions on how a digital video should be played, where only certain frames of a video are chosen for display.

Digital editing typically is performed in a processing system and involves random retrieval of information from storage, communication of the information, e.g. display on a monitor, and manipulation of the information to produce the desired presentation. A portion or portions of sequential information, also referred to as a "clip," such as a continuum of segments, frame, block or footage, may be rearranged into a desired order. Typically, the presentation appears as a seamless flow of the edited information. Editing may further entail removing portions of clips. During editing, particular "edit features" may be added to the presentation, such as transitions between clips, special effects (e.g., black and white, brightness, contrast, texture, echoes, compositing, blurring, etc.), text, graphics, black background, silent audio segments, combinations of different types of time-based streams of information, such as audio and still images, and the like. Various types of editing may be performed as new techniques for altering raw information are created.

Traditionally, editing of multimedia to produce presentations involved complex techniques performed by trained professionals. However, recently novice users have become interested in making presentations, as well. There has been increasing popularity in the processing of multimedia to produce sophisticated home movies, web sites, business presentations, amateur movies, etc.

Given the currently diverse level of skills among authors of presentations, it is desirable to provide processing a system that is easy and convenient to operate. Such a system should require less hands-on activity of the user and have a simple user interface display.

Although previous authoring systems provide for varying levels of ease for the novice user, there are still several drawbacks to these systems. Some prior systems include Studio DV from Pinnacle Systems Inc. of Santa Clara, Calif.; Avid Cinema® from Avid Technology, Inc. of Tewksbury, Mass.; Adobe Premier® from Adobe of San Jose, Calif.; Dazzle* Digital Video Creator™ from Dazzle Multimedia of Fremont, Calif.; and DVgate™ from Sony Corporation of Tokyo, Japan.

In general, processing systems require that the time based stream of information be captured from a media source and entered into the system. The information and the newly created presentation are stored within memory of the system.

The time based streams of information entered into the processing system consume an enormous amount of storage space within the system. For long presentations, such as business presentations or short film, the typical processing system provides an insufficient amount of storage space. For example, a 9 gigabytes hard drive that handles a sustained throughput of 5-7 megabytes/sec permits approximately a mere 40 minutes of video to be stored. Thus, it would be useful for a processing system to include enough storage space for a given presentation.

Typically, the presentation is in the form of references that correspond to the stored information. The references have instructions on handling the information. These processing systems permit the user to control what is viewed in the presentation by moving the in and out points in the references to indicate the segments of information that are to be accessed. Thus, a presentation may include instructions regarding the portion of the information in which output is to begin and the portion of the information where the output is to cease. For example, the references may direct the select portions of the information that are to be included in the presentation. The references also may include edit features to be added to the presentation. In these instruction-based processing systems a user's edit choices are embodied by the references.

Through a user interface, reference elements that represent selected clips that are to be included in a presentation are moved on the screen and displayed along extended windows, referred to as time lines or tracks. Such time lines represent the time course of a presentation and the position of each reference element on the time line dictates the order of the associated clip and edit feature in the presentation. Simple mechanisms to reposition the references onto appropriate positions of the screen would be beneficial for the user.

Prior systems generally have complicated user interfaces for edit of the time based stream of information. These processing systems display multiple time lines or tracks, where each time line is for the individual types of edit features to be included in a presentation. The separate time lines are usually oriented in parallel to each other. For example, as shown in FIG. 1, a user interface 1 has a first time line 2 that contains a sequence of original clips (1-3) 3 along the first 3.00 minutes of the presentation. A second time line 4 has a clip with an edit feature 5 in the form of text at minute 3.00 to 4.00. A third time line 6 has a clip with a special effect 7 at position 4.00 to 5.00 minute. These processing systems combines the information positioned along all of the time lines to form the presentation. Thus, in creating the presentation, the user works on each separate time line window for each type of attribute of the presentation. Where there is no single time line that integrates all attributes of the presentation, the user must mentally combine to all of the time lines to determine what the final presentation will be like.

A problem with these prior user interfaces is that the compounded time lines complicate the editing process for the user. In addition, the display of multiple time lines wastes screen real estate that may be better served to display other useful editing tools. Moreover, the data included in each time line is typically stored in separate areas of storage within the processing system. Thus, multiple time lines pointlessly consume precious storage space.

In light of the shortcomings of the various currently available systems, there is still a need for creating a presentation of a time based stream of information in a manner that is quick and easy to perform. In particular, there is a desire for a processing system that has a simple user interface that provides efficient use of screen display and storage by providing a single time line for editing of presentations. The system should also encompass convenient mechanisms to move data on the screen display.

SUMMARY OF THE INVENTION

In one embodiment of the present invention, a method for manipulating a time based stream of information in a processing system for generating a presentation is provided. The method allows for editing of references to the time based stream of information and positioning of the references along a time line. In one aspect of the method the processing system employed has functionality to provide only a single time line on a user interface for aligning references (depicted as reference elements) corresponding to visual time based stream of information. The time line is capable of handling references that include a variety of types of edit features, such as transitions between clips, special effects, text, graphics, black background, still images, combinations thereof, etc. Furthermore, these reference elements are moved around the user interface by user commands to drag and drop and/or cut and paste.

In some cases, the single graphical representation of a time line includes at least two references and it is desired to insert another reference having an edit feature between the two references. The edit feature reference may be nested by dragging its reference element to the time line in a position between the first and second present reference elements on the user interface. The second reference element shifts down the time line to make space for the inserted edit feature reference.

In various embodiments, the reference with the edit feature is provided by use of an edit box. The reference is moved to an edit box and the desired edit feature is attached to the reference in response to user edit commands. The reference element may be moved to the edit box by various means, such as dragging and dropping the reference element or by cutting the reference and pasting the reference over the edit box. Usually, placing the reference element in the edit box does not remove the reference element from its current location, such as its place on the time line, but rather enables editing of the reference by use of the edit box. A current edit feature of a reference may be optionally further edited by selecting the reference. An edit box automatically pops up on the user interface in response to this selection command.

The use of the single visual time line is direct in that the editing process is simplified for the user and space on the user interface as well as in storage is conserved. The various editing tools on the user interface are designed for ease of use.

Other features and advantages of these and other embodiments are discussed in detail below.

BRIEF DESCRIPTION OF THE DRAWINGS

The present invention and its comparison with prior systems is illustrated by way of example, and not limitation, in the figures of the accompanying drawings in which:

FIGS. 4A-4C illustrates examples of various areas of storage, wherein FIG. 4A shows one embodiment of an information storage area having clips of time based streams of information, FIG. 4B shows one embodiment of a reference storage area and FIG. 4C depicts one presentation storage area during generating of a presentation.

FIGS. 5A-5B illustrate flow charts depicting methods for editing, in >accordance with the present processes, wherein FIG. 5A shows a method of cutting and pasting a portion of reference data and FIG. 5B shows a method of adding an edit feature to reference data.

FIGS. 6A-6C are examples of user interfaces for use in editing, according to one embodiment of the present invention, wherein FIG. 6A is a GUI showing a reference icon, FIG. 6B is a GUI showing controls for editing text into a presentation and FIG. 6C is a GUI showing controls for editing transitions into a presentation.

DETAILED DESCRIPTION

The methods described below are employed by an authoring tool configured to provide editing of a time based stream of information to generate a presentation. The processing system that may be utilized by the editing methods employs a user interface displaying references to the time based stream of information and other presentation attributes. Through the user interface, the system permits a user to easily control the editing process and select the information to be included in the presentation. The user interface has only a single time line for arranging various visual information to be included in the presentation. The system providing a solitary visual time line permits a conservation of storage areas allocated to the presentation.

The user interface also has simple mechanisms for moving references on the screen. One such component is a "drag and drop" control allowing the user to select references, drag them across the display screen and drop the references at some desired position, e.g. along the time line. In addition, a cut and paste edit component permits a user to select a reference, remove the reference from the display and paste it back onto any portion of the display.

The time based stream of information and related presentation created by use of the processing system may be of any form, such as full motion images with audio, full images without audio, audio only, still images, motion graphics or any combination thereof.

Hardware Overview

Figure 1:
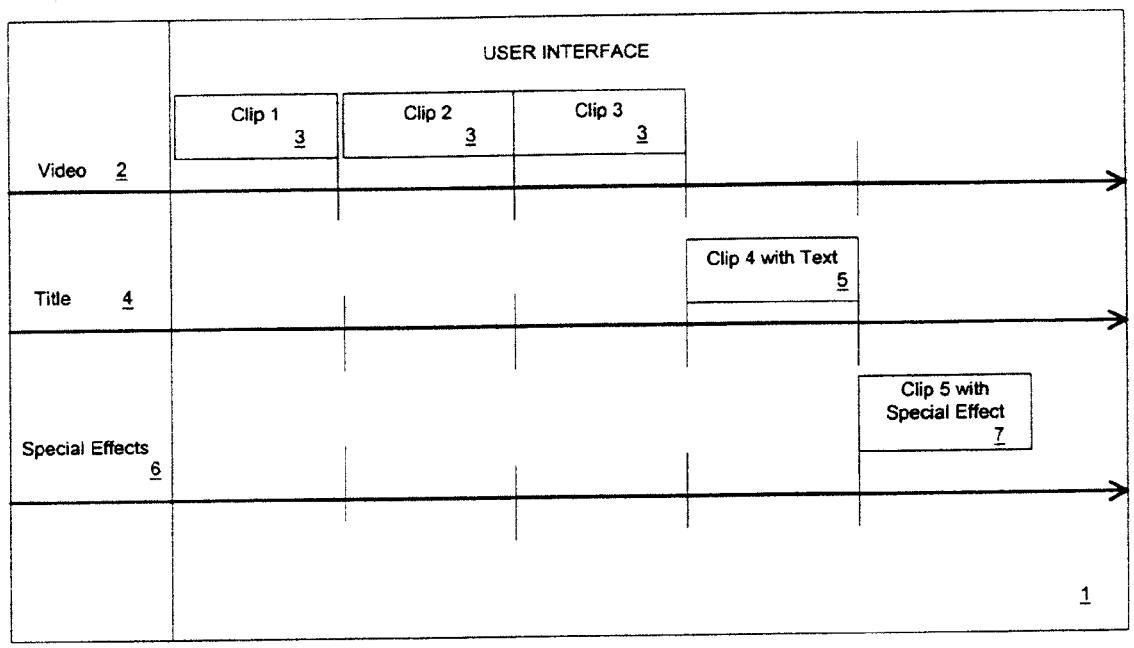
FIG. 1 shows an exploded view of a user interface in a prior processing system having multiple time lines.
Figure 2:
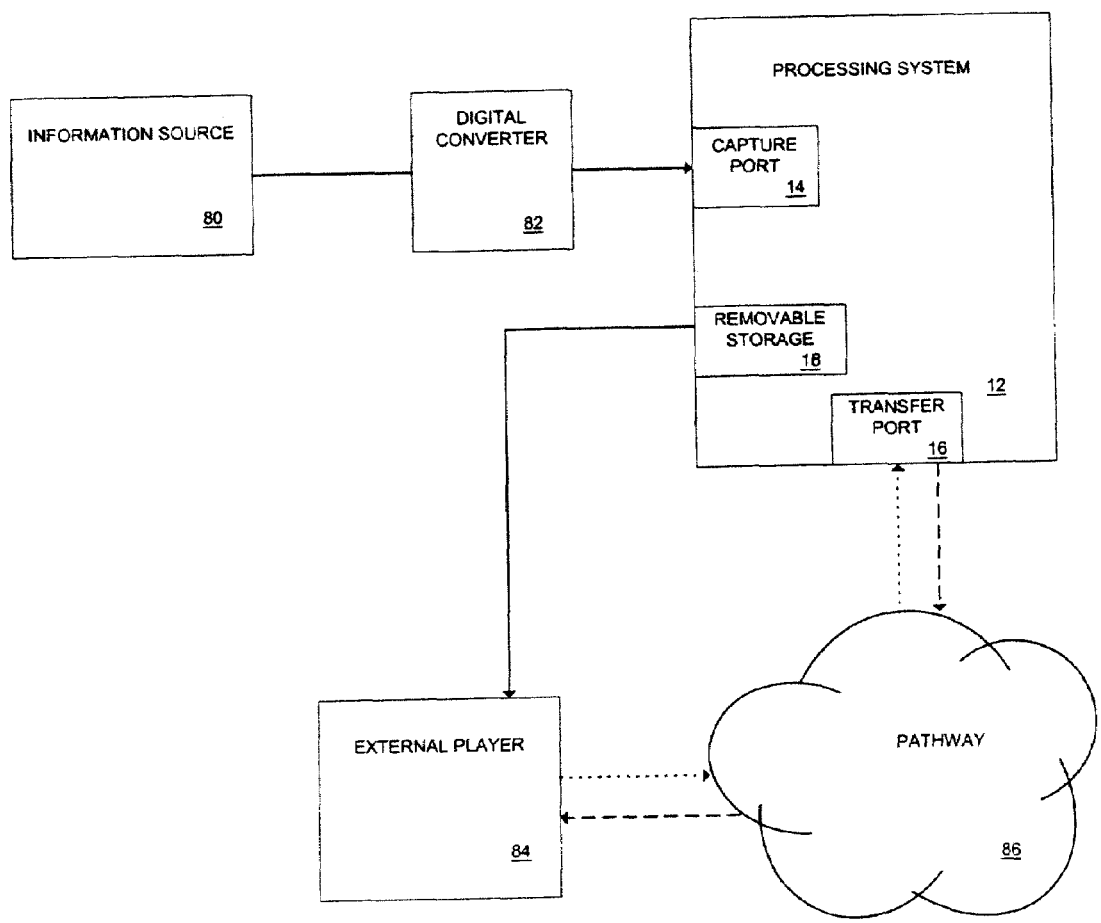
FIG. 2 illustrates one embodiment of an authoring environment in which a time based stream of information may be processed, in accordance with the teachings presented herein.

FIG. 2 illustrates an exemplary authoring environment 10 in which a time based stream of information may be processed to produce a presentation. A processing system 12, according to one embodiment of the present invention, is in communication with an information source 80 that has a time based stream of information at a capture port 14 (i.e. information collection interface) and optionally through an intermediate digital converter 82. Processing system 12 may read, copy, manipulate, store, delete, output, print and/or transfer information provided by source 80. An optional external player 84 receives communication from processing system 12, either indirectly from a transfer port 16 and through pathway 86, and/or directly through a removable storage medium 18. Although FIG. 2 demonstrates one layout of authoring environment 10, the scope of the present invention anticipates any number of information sources and players, configured in accordance herewith and arranged in various fashions.

The information source 80 is any type of device that generates and transfers data or data signals related to the time based stream of information. The information source 80 may be a photographic or full motion image capture interface such as a camera, camcorder, digital camera, etc.; a sound capture interface, such as a laser disc player (e.g. CD player), tape player/recorder, MP3 player, microphone, etc.; a keyboard; a scanner; a computer; a server; a computer program; a sensor; any one of numerous available data collection devices; etc.

The information source may generate digital data signals and be communicatively coupled directly to the processing system 12. Alternatively, the information source may generate signals in a format other than digital, e.g. analog signals. As shown in FIG. 2, such non-digital data source may send signals to a digital converter 82 for changing the signals into a digital format prior to transfer of the data to the processing system 12.

Communication between the information source 80 and the processing system 12 is often through means of a FireWire® (from Apple Computer, Inc. of Cupertino, Calif.), iLink or IEEE 1394 communication protocol. Where a FireWire brand protocol is employed, capture port 14 in the processing system may be a six-pin FireWire brand port. Also, a corresponding four-pin FireWire brand port may be present on the digital converter 82, where a digital converter is included, and/or on the information source 80. In this case, a six-pin-to-four-pin cable may be used to connect the ports of the digital converter 82 or information source 80 and processing system 12.

Other communication schemes are also suitable for transfer of data from information source 80 and/or digital converter 82 to the processing system 12, such as an Ethernet connection (i.e., capture port 14 may be an Ethernet port), serial interfaces, parallel interfaces, RS422 and/or RS432 interfaces, Livewire interfaces, Appletalk busses, small computer system interfaces (SCSI), ATM busses and/or networks, token ring and/or other local area networks, universal serial buses (USB), PCI buses and wireless (.e.g., infrared) connections, Internet connections, and other communication links for conveying the time based stream of information from an information source 80 to the processing system 12. In addition, source 80 may store the information on a removable storage source, which is coupled to, e.g. inserted into, the processing system 12 and in communication with the capture port 14. For example, the source 80 may be a tape, CD, hard drive, disc or other removable storage medium.

Processing system 12 is any device configured to receive the time based information and manipulate the information to generate a presentation, e.g. a computer system or workstation. In one embodiment, the processing system 12 includes a platform 20, e.g. a personal computer (PC), such as a Macintosh® (from Apple Computer, Inc. of Cupertino, Calif.), Windows®-based PC (from Microsoft Corporation of Redmond, Wash.), or one of a wide variety of hardware platforms that runs the UNIX operating system or other operating systems. Often, the processing system 12 is configured to send the resulting presentation to an external player 84.

The external player 84 may be an IP host, a computer, a personal digital assistance (PDA), a server, a tape/CD/MP3 player, or other device that is configured to receive presentation information from processing system 12 and to display the presentation. In one instance of an authoring environment, the external player 84 is the same device as the information source 80, such as a camcorder. In still another case, no external player is provided and the presentation is played on the processing system and/or projected from the processing system onto a medium, e.g. a screen.

The external player 84 may receive information directly through removable storage 18 from the processing system 12. Removable storage 18 represents any of a number of detachable storage mediums, e.g. magnetic, optical, magneto-optical, tape, and/or other type of machine-readable medium or device for storing information. For example, the removable storage 18 may be a hard disk, a read-only or writeable optical CD (e.g. CD ROM, DVD), a disc, tape, etc.

External player 84 may also receive presentation information indirectly from the processing system 12, such as through a pathway 86. The communication pathway 86 may be through various networking mechanisms, such as a FireWire brand connection (or iLink or IEEE 1394 connection), LAN, WAN, telephone line, serial line Internet protocol (SLIP), point-to-point protocol (PPP), an XDSL link, a satellite or other wireless link, a cable modem, ATM network connection, an ISDN line, a DSL line, Ethernet, or other communication link between the processing system and external player.

Figure 3:
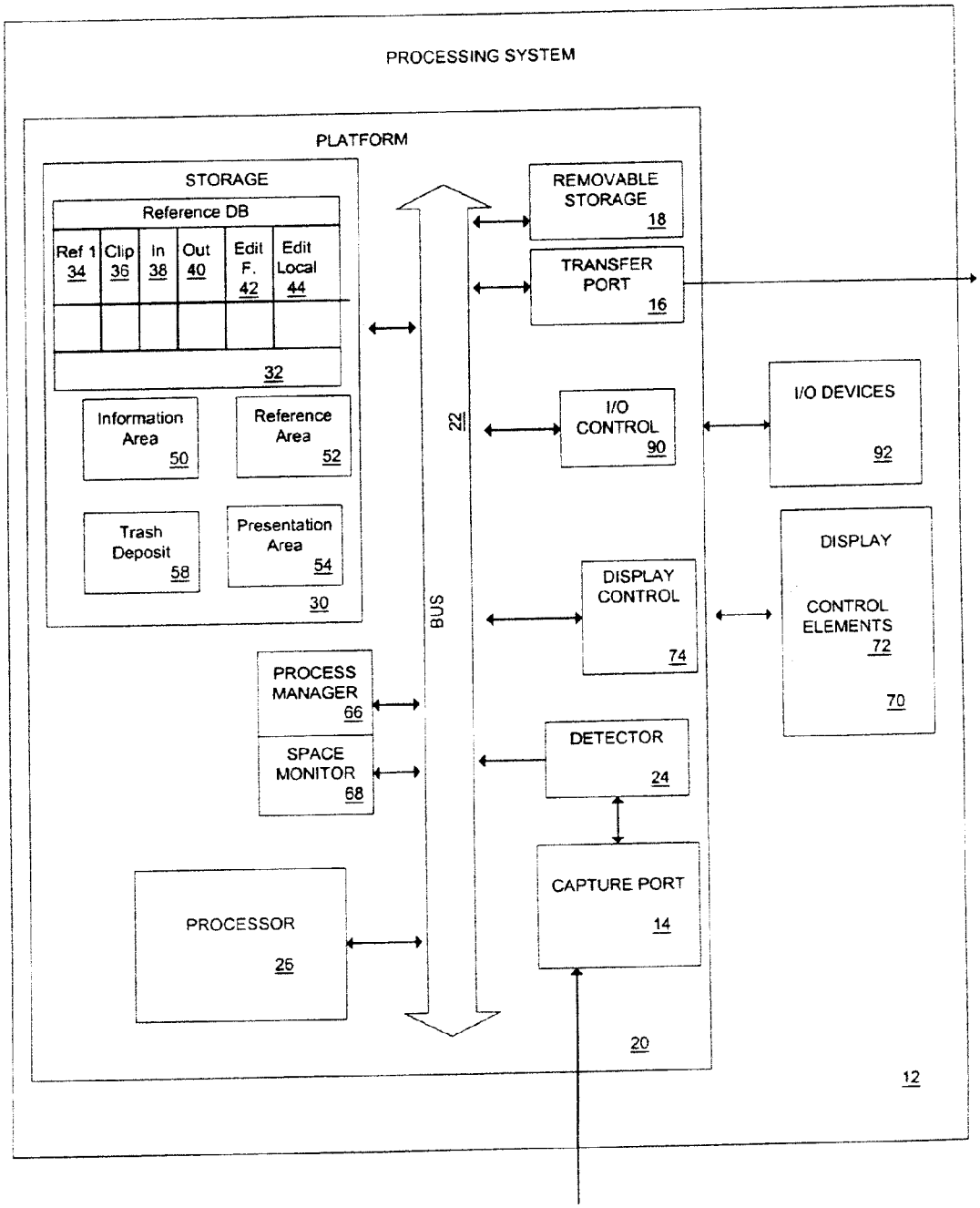
FIG. 3 is a block diagram of one embodiment of a processing system, configured in accordance with the teachings presented herein.

The processing system has components for handling time based information in various ways. As shown in FIG. 3, these components include a capture port 14 for acquiring the information, a storage 30 for holding the information, a processor 26 for manipulating the information, a process manager 66 for instructing the processor on editing and storage of information, a display 70 for showing a user interface and possibly a transfer port 16 or removable storage 18 for sending the information so processed. Upon review of this specification, it will be appreciated by those skilled in the art that the components of processing system 12 may be connected in various ways in addition to those described herein.

Now referring in more detail to the components shown in FIG. 3, processing system 12 includes processor 26, which may represent one or more processors. Some exemplary processors are a Motorola Power PC processor, an Intel Pentium (or x86) processor, etc. The processor 26 may also be a microprocessor. The processor 26 runs an operating system and applications software that controls the operation of other system components.

Storage 30 is coupled to processor 26 by a bus 22. The storage 30 may be a dynamic random access memory (DRAM) and/or may include static RAM (SRAM). Typically the storage is a hard disk drive, but may alternatively be another magnetic disk, a magneto-optical disk or other read/write device. The processor may also be coupled to other types of alternative storage areas that may be considered as part of the storage 30 or separate from the storage 30. Such alternative storage areas may include cache, flash memory, etc., and which may also be considered the removable storage 18. Usually storage 30 has a capacity in the megabyte to gigabyte range, and more typically, at least 2 gigabytes capacity and can sustain throughput of at least 3.5 megabytes per second of information. However, as technology advances, the capacity of the storage may increase. The storage 30 contains the acquired time based stream of information within files as well as executable code that provides functionality for processing the time based stream of information in accordance with the present invention. The storage also has at least one and usually multiple references to the stored information. The reference includes data, e.g. instructions, on how the processor is to read and/or manipulate the stored information. Typically, a reference is an object that corresponds to individual clips of information. The reference data include at least one in-point that specifies where the processor is to start accessing the stream of information and at least one out-point that identifies where to stop access of the information. The reference may also contain instructions on adding particular edit features to a presentation that are in addition to the stored information. Some edit features are text, transitions, graphics, special effects, overlays, three-dimensional images, audio, etc. and location data on where such edit features are to be presented in the time based stream of information. Edit features are any of various modifications to the original information for use in the presentation that exist with current editing technology or may be created in the future.

Figure 4A:
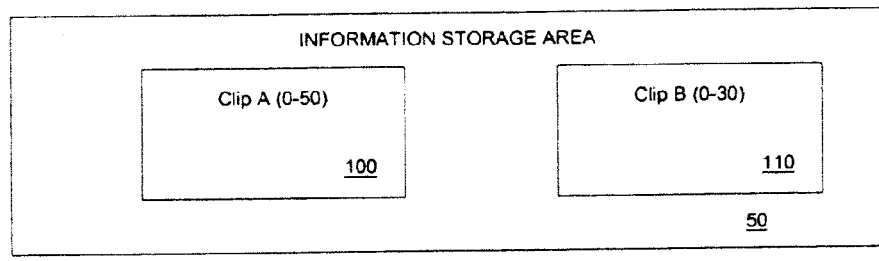

The time based stream of information is stored within files in an information storage area 50. One exemplary information storage area 50 is depicted in FIG. 4A as having a segment of a time based stream of information, clip A 100 with units (0 to 50), and another fragment, clip B 110 having units (0 to 30).

Figure 4B:
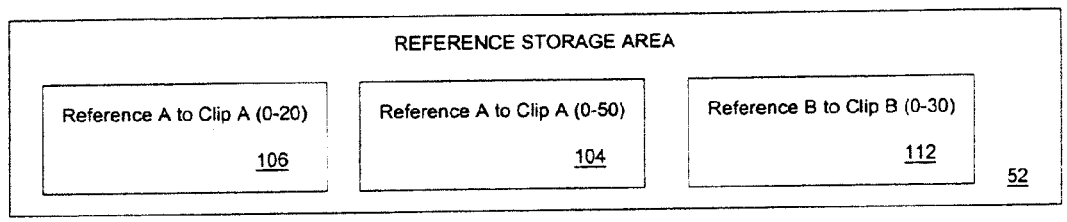

The storage also has at least one and usually multiple references to the stored information in a reference storage area 52. One embodiment of reference storage areas 52 representing an edit is shown in FIG. 4B, where reference storage area 52 corresponds to the information of FIG. 4A with modified reference A1 (0 to 20) 106 corresponding to clip A, but only from units (0 to 20) 100, a copy reference A2 (0 to 50) 104 and reference B (0 to 30) 112 corresponding to clip B units (0 to 30) 110.

Figure 4C:
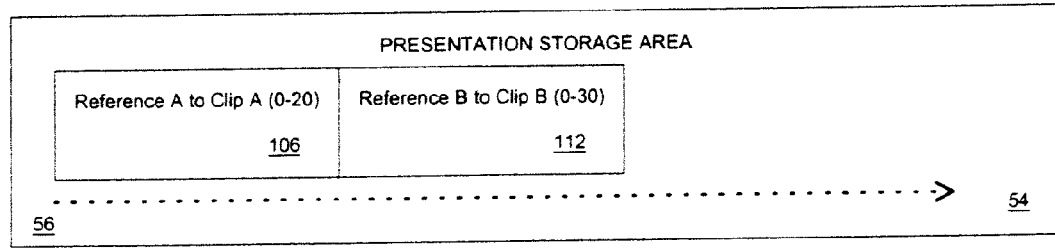

The presentation that is generated by the processing system, as represented by the references, is stored in presentation storage area 54. The presentation storage area includes data related to when the information is to be displayed along a presentation time line 56. One presentation storage area 54 that draws upon the pool of reference data from FIG. 4B is shown in FIG. 4C and begin with reference A1 (0 to 20) 106 corresponding to clip A units (0 to 20) 100 and immediately followed by reference B 112 corresponding to clip B units (0 to 30) 110.

A reference database 32 within the storage 30 contains an index of the stored references. Each entry 34 in the database is to a reference. The database contains data found within the reference such as clip 36, in-point 38 and out-point 40. For example, a reference 1 may indicate clip A with an in-point at frame 0 and out-point at frame 60. The database may also include other reference data that assists in generating a presentation.

Further to the storage 30, an optional trash depository 58 may be included to temporarily hold references, reference data, the time based stream of information, or any portions thereof. The contents of the trash depository may be accessed, manipulated, or removed by the processing system. Often, the trash depository 58 serves as a holding bin for unwanted data prior to its deletion from storage. By dropping the data into the trash depository, the user may continue with uninterrupted editing and later empty the trash, i.e., delete the contents and any associated information, at a convenient time.

A process manager 66 is coupled to storage 30 and processor 26 through bus 22 for carrying out various tasks that control the edit and storage of information and reference data. During the capturing of information, process manager 66 may allocate space on the storage for keeping a new information file. The process manager receives selection commands, such as from a user input or software instructions, and responds by selecting the appropriate information and/or reference data, which may be an entire file of information/data or portions thereof. The commands may be provided by a user selecting reference data, where the selected data may be an entire reference or a portion of the reference. The selected information may also include several files of information/data. As shown variously by the flow-charts in FIGS. 5A to 5B, the process manager carries out edit commands by modifying the reference data and/or information in storage.

(1) Cut and Paste Editing

Figure 5A:
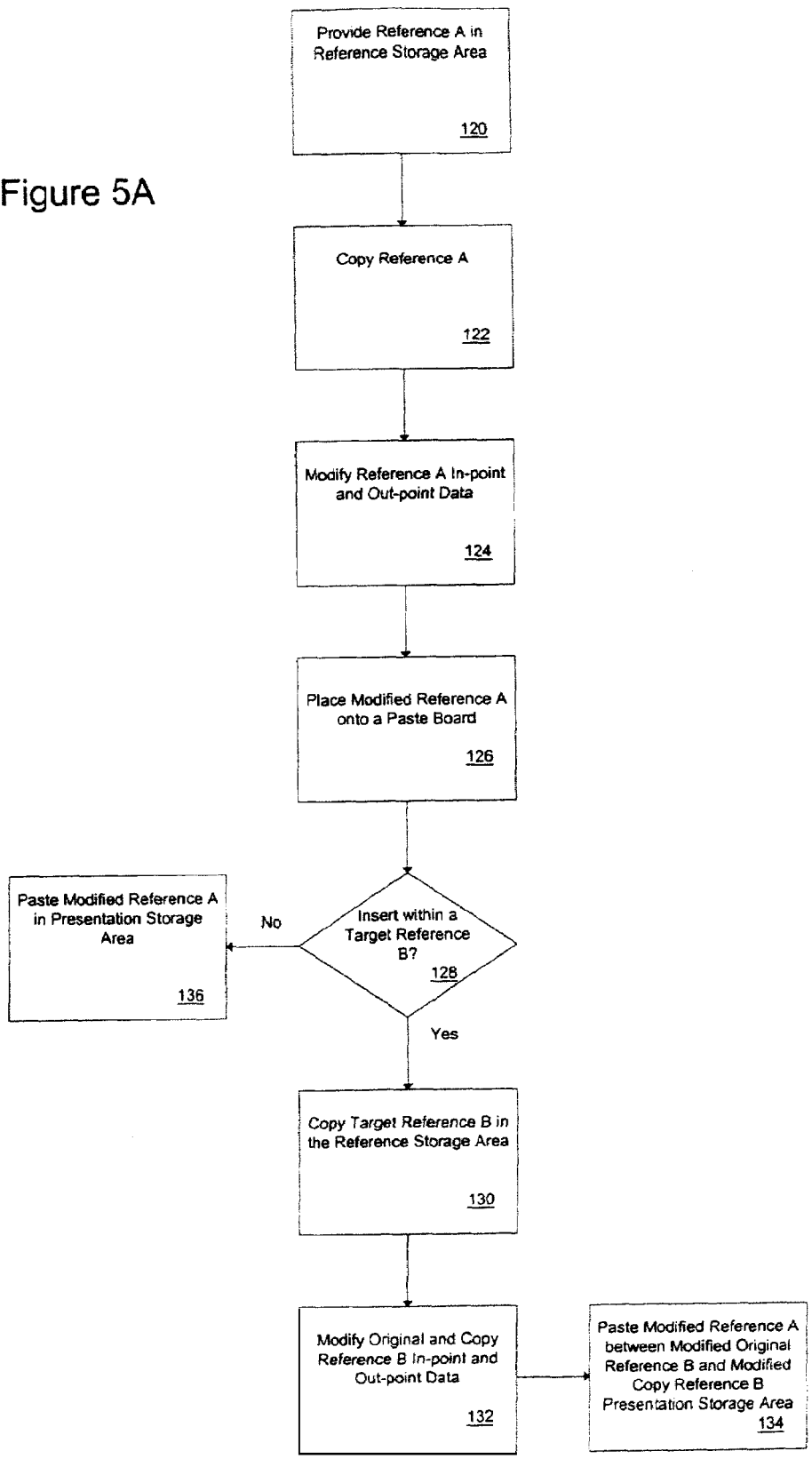

FIG. 5A shows an example of a method of cutting or copying a portion of a clip during the processing of a presentation. A first reference is initially provided 120. For example, reference A1 corresponding to clip A (0 to 50) is presented. Next, the processing manager copies the reference. For example, reference A1 is copied to create a duplicate reference A2 (0 to 50) 122. The process manager changes the reference data of either the original or copied reference to reflect edit command requests. In the example, the in point and out point of reference A2 are modified to (0 to 20) 124. The process manager places modified reference onto a paste board 126 for inserting into a presentation. The reference data that is present in the paste board may be inserted at any point in the presentation along the time line in presentation storage area 54. Where the reference is to be placed prior to or after another reference already present in the presentation storage area, or if there are no other references provided in the presentation storage area, the reference is simply pasted into the storage area 136. If the reference is to be placed within another reference, the other reference is first split 128 by copying the other reference 130 and modifying the in and out points of the other reference and its copy to reflect the split 132. The modified reference A is then pasted between the two reference B's in the presentation storage area 134.

In the example, reference A2 is moved to a paste board file in storage. The presentation storage area has a third reference B1 (0 to 30). Reference A2 is intended for a position after unit 15 within reference B1 (0 to 30). To accomplish the nesting of reference A2 within reference B1, the data in reference B1 is split. Reference B1 (0 to 30) is copied to create reference B2 (0 to 30). The in and out points are changed so that the reference B1 (0 to 15) corresponds to the first clip portion prior to the inserted reference A2 and the reference B2 (16 to 30) corresponds to the second clip portion following reference A2. Reference A2 is then placed after reference B1 along the time line in the presentation storage area 56.

In subsequent steps, the cut and paste process may be undone to retrieve the original data. In the example described in FIG. 5A, reference A2 may be deleted in response to a deletion command and reference A1 is preserved. The continuum time line between reference B1 and B2 is also restored such that there is no gap where reference A2 had previously been positioned. Although referenced B1 and B2 may remain split, the two references run seamlessly to appear as though there is a single reference to the clip.

(2) Adding Edit Features

Figure 5B:
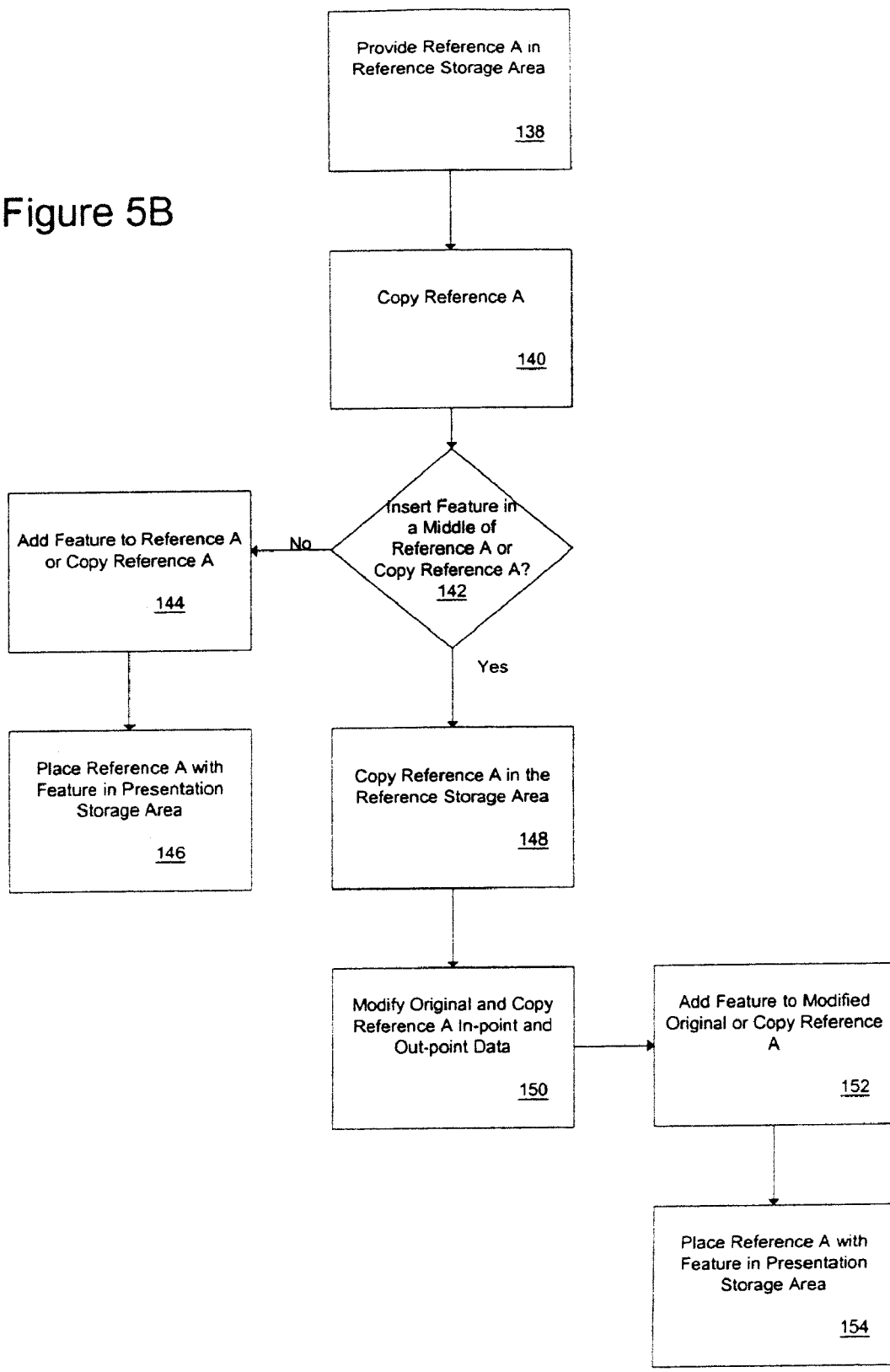

FIG. 5B shows an example of a method of adding edit features to a clip during the processing of a presentation. A reference is initially provided 138 and then copied 140. Usually, selected edit features may be added to either the beginning or ending portions of the clip represented by the original or the copy reference 142. Where the edit feature is intended for the beginning or ending unit(s) of a reference, the feature is simply inserted in the reference 144 and the reference having the edit feature is placed in the presentation storage area 146. Movement of the reference may be through the cut and paste methods described above or by a user command to drag and drop the reference in place.

For example, to add an edit feature, a reference A1 corresponding to clip A (0 to 50) is provided. The reference A1 is copied to create a duplicate reference A2 (0 to 50). The reference A1 may be modified to insert text to the beginning portion of the clip (first frame) or to the ending portion of the clip (last frame).

In the alternative, text may be added to a middle portion of a clip, as shown in FIG. 5B. The reference that is targeted for text editing is split at the location for the text 142 by copying the reference 148 and modifying the in and out points of the reference and its copy to reflect the split 150. The text may be added to the beginning unit(s) or ending unit(s) of the split reference 152 and the edited reference added to the presentation storage area 154. In the example where text is added to reference A2 (0 to 50), reference A2 (0 to 50) is split at the point in which text is to be added to form reference A2(*a*) (0 to 25) and reference A2(*b*) (26 to 50). The text may be added to the last unit of reference A2(*a*) at 25 and may additionally be included in any sequential units previous to 26 without skipping any units in the timeline. It is also possible to add the text to reference A2(*b*) starting at unit 26, and to any sequentially following units without skipping any such units.

The methods described in FIGS. 5A and 5B may also be applied to adding any time of editing features to the presentation in addition to text, such as transitions, audio, graphics, etc.

At times, an edited version of the time based stream of information may be produced by the system and stored. The time based stream of information that corresponds to an edited reference is copied into storage. Then, either the original or copy of the information is modified to reflect the edited reference. Thus, the storage includes both the original time based stream of information and edited version of the information.

Further to the edit capabilities of the processing system, the system may receive a trash and/or delete command, such as from a user input or software instruction. The process manager 44 may respond to the delete command by deleting the relevant information and references thereof. Furthermore, where the selected data is cut and placed onto a paste board, the process manager may respond to a delete command by deleting the data from the paste board and as well as its associated information.

Such deletion may be by the process manager directly and permanently eliminating the selected information (and associated reference data) from storage. Such direct elimination may take place by the process manager copying over the relevant file. If there is any information occurring prior to or after the eliminated section, the remaining information appears to be continuous and uninterrupted by the copy over the excluded section. In the alternative, the deletion may also take place by changing a virtual file allocation table (VFAT, FAT or FAT32) to indicate that the space that has been used by that file is available for reuse by another file. When new files are written to that space, the deleted data is overwritten and thus, permanently eliminated. Prior to this overwriting, it may be possible for the deletion to be reversible.

In one embodiment, direct elimination of information occurs where the beginning portion or middle portion of a clip in a file is selected for deletion. This elimination may occur by various mechanisms. In one embodiment, the system may copy the portion that is to be preserved into a new file and the old file may be removed. In another instance, the system may simply shift over the preserved data to replace the eliminated data. For example, where units 0-30 are to be eliminated from a clip of 0-40, units 31 to 40 may be moved into the space previously occupied by 0-30, thus creating a clip 0-9. In this manner the header information that may be present in the beginning of a clip may also be preserved.

Where a tail end of a clip in a file is to be deleted, the clip may be merely truncated such that the ending portion is marked as extra space that is available for reuse. Thus, the beginning header information is still present in the file. Furthermore, in order to erase all of a file that is selected for elimination, the deletion may take place by merely marking the entire file as deleted and available for reuse as described above.

In any case, the process manager may also be triggered to perform several relevant routines upon receipt of the delete command. In one embodiment, a reference check method is performed when the system receives a selected information command and a delete command. The process manager responds to the delete command by checking in the reference database to determine if a single or no reference data to the selected information exists. Where the process manager concludes that more than one reference data set to the selected information exists, the process manager fails to eliminate the selected information from storage. Rather than deleting the information from storage, only the selected reference data is deleted. On the other hand, if the process manager establishes that more than one reference data set to the selected information does not exist, the process manager deletes the selected reference data contained within a reference or portion of a reference, if any are such data present in the storage, and also deletes the selected information from storage.

In some embodiments of the processing system, a trash procedure is performed by the process manager. The system receives a selected information command and a trash/delete command, such as from a user input or software instructions. In response, the process manager extracts the selected reference data, which may be an entire reference or selected portion of a reference and places it into a trash depository. At any time while the reference data is in the trash depository, the processing system may receive a cancel command, such as from the user or other means. In the case of a cancel command, the process manager returns the reference data back to its original location and restores the initial reference, e.g. in and out points, rather than deleting the reference and the information. Where the processing system receives a trash/deleted command and no cancel command is received, the process manager then may either delete the information and associated reference data, or in the alternative, respond to the delete command by performing the check procedures from step describe above in which the contents are deleted if more than one reference data is not found.

The total amount of storage space available for new files is determined by a space monitor 68. Space monitor 68 is coupled to storage 30 through bus 22. When a new file is created to hold information, the space monitor ascertains the amount of space that is utilized by the new file and subtracts this consumed space to recalculate the remaining amount of space in storage.

In the processing system 12, the processor 26 is further coupled by bus 22 to an input/output (I/O) control 90, a transfer port 16 and/or removable storage 18. The I/O control 90 commands one or multiple I/O device(s) 92. Some conventional I/O devices are key boards, mouses/trackballs or other pointing devices, microphones, speakers, magnetic disk drives, optical disk drives, printers, scanners, digital cameras, etc.

In one configuration of processing system 12, a means for communicating with an information source that has a time based stream of information is provided. For example, bus 22 additionally couples detector 24 to the processor 26. The processing system may detect a connection between the processing system and the information source through detector 24. The detector 24 performs an inquiry as to whether an information source is in communication with the processing system. The detector determines a connection with the information source by sensing particular signals, such as electrical current output, that are released from the information source, and usually when the source is energized, i.e. "turned-on." The detector may be further configured to conduct periodic checks for communication with the information source.

Further to the details of platform 20 in FIG. 3, a display control 74, e.g. video board, is coupled to the processor 24 also through bus 22. The display control 74 communicates with the display 70 in the processing system 12 to couple the display 70 to the platform 20. Display 70 may be any one of a number of conventional display devices such as a liquid crystal display, cathode ray tube, plasma display, video display, or other type of display device. For sharp colors and grayscale, display 70 may be an SVGA monitor, with a resolution of 800×600 (26 dpi) or better, with an active area of at least 15 inches, and may be controlled using a true color video card.

Means are provided for capturing the time based stream of information from the information source, such as a capture card or other capture mechanisms. The transfer rate of the information entering the system is usually the same or substantially the same speed that the information runs prior to entering the system, such as the rates established by the video standards of various regions. For example, movie film usually runs with a speed of 24 fps. Some video follows the NTSC (system used in North America and Japan), where the video speed is 30 fps.

The information may be captured and written into storage by various mechanisms. One capture mechanism is a sequential-type method in which an application procedure is executed when the processing system is in capture mode. In one stage of the application procedure, signals from an information source are captured. The system reads the information, shows the information on the display and writes the information to a storage medium. However, when control elements are activated, the system moves away from the capture step and switches to another stage that includes a process control commands loop for handling the control instructions. The CPU of a system employing such a sequential-type method is dedicated to processing the control commands. While application procedure is in the process control command loop, the capturing operation ceases and the processing system stops communicating with the information source. During this period, the information that is released from the information source does not get loaded into the system. Rather, the processing of control commands continues through to completion, at which time, the capturing step may continue.

Another capture mechanism, according to the present invention, is a low-level interrupt-type method, which effectively permits intermittent processing of control element commands while, at the same time, loading the time-based information. With the interrupt-type method, in addition to the capture application, a user may run any software applications, e.g. network communication protocols, such as Appletalk, Internet or e-mail applications, word processing applications, etc.

An interrupt-type method includes an application procedure that may be executed when the processing system is in capture mode and when it is not in capture mode, e.g. when the system is in edit mode. Where the processing system is operating in a non-capture mode, the application procedure conducts normal operations, such as processing of control commands from control elements. However, when the capture mode is indicated, the interrupt procedure fires the appropriate capture tasks and causes a temporary suspension of the application procedure in an asynchronous manner. Thus, the processing of control commands proceeds until the capture process interrupts the other application tasks.

This interrupt procedure may be performed at periodic intervals and are certain to iterate at regular times, despite the activities, e.g. processing of control commands, of the application procedure. The interrupt procedure includes a quick reading of incoming information, copying the information into a proxy, outputting the information and writing it into storage where the information may be further edited by use of the control elements. The interrupt procedure is advantageous in that the process is very quickly performed and rapidly repeats. The time for performance is less than the transfer rate of the information entering the system.

The repetitions of the interrupt procedure occur at a rate that is substantially similar to or the same as the transfer rate. Thus, all of the information may be read and stored while still processing control commands in-between each of the iterations of the interrupt procedure. As a result, the user does not recognize the interruptions and the capture process as well as other instructions appear to be simultaneously executed by the system. Moreover, the interrupt procedure guarantees that information is not omitted from the reading step because the iterations of the interrupt procedure and length of time to perform are timed to correspond with the rate of information transfer from the information source.

For transfer of NTSC video, the interrupt procedure iterations are typically at least every 1/29 to 1/30 second and more usually 1/293.97 second to 1/30 second. For PAL systems (systems used in parts of Europe, China and Hong Kong), the frame rate is 25 fps and thus interrupt procedure is substantially at least every 1/25 second. In general, the interrupt procedure should iterate close to the transfer rate or slightly faster than the transfer rate, e.g. within at least 1/10th second of the transfer rate and more typically within 1/100th second. The iterations should not be slower than the transfer rate and the iterations are usually at the rate that corresponds to the frame rate of video standard.

Usually, the processing system according to the present invention, outputs the information, e.g. depicts the information on the display at a rate (the "output rate") that is substantially similar to the rate in which each unit of the information, e.g. frame of video, is arriving from the information source (the "transfer rate"). In contrast with prior systems, where low quality displaying (i.e. considerably lower than the transfer rate, such as 30 to 70% of the transfer rate) is used to devote more of the system to capture, the present invention may use high quality (i.e. the same or substantially similar to the transfer rate, such as greater than 70% and more usually 93 to 100% of the transfer rate) because all of the information is certain to be stored by the interrupt procedure. The speed at which the information is displayed depends on numerous factors, such as side operations being simultaneously performed by the system, e.g. network access and CD ROM detection, image quality, e.g. based on decompression schemes employed, and processor speed or graphic acceleration. For example, where the transfer rate is about 30 frames per second (fps), the corresponding output rate of the present invention is usually 29 to 30 fps. The transfer rate depends on the particular transfer rate standard employed, as described in detail below. The resulting capture output is of high quality that is similar to the quality of the information residing in the information source.

During the capture process, the time based stream of information is written into storage to be referenced while creating the presentation. For convenience, the stored information may be compressed to conserve storage space. Generally, compression formats are either high efficiency or low efficiency and either loss-less or lossy. Lossy compression schemes are characterized by components of an original image being absent from a reconstructed image after a compression-decompression cycle, whereas loss-less schemes do not drop any information.

Low compression schemes (i.e., those that do not provide significant compression ratios) that may be used include joint photographic experts group (JPEG) compression schemes that use Fourier analysis-based methods, such as the discrete cosine transform, to compress data; graphics interchange format (GIF) compression schemes, which use LZW algorithms; bitmapped image compression schemes and tagged image file format (TIFF) compression schemes, etc. Alternatively, high efficiency compression schemes, such as wavelet, motion wavelet, Motion Picture Experts Group (MPEG) motion JPEG, Lempel Ziv and/or fractal compression schemes, etc., may be employed. Use of high efficiency schemes may be preferred where storage space is limited. For example, wavelet compression schemes may be 20 times more efficient than JPEG compression schemes, providing for a more detailed representation of the data at the same bit budget. Once the time based information is captured and stored, it may be referenced for editing and generating a presentation.

The editing of stored information is often through the output, such as depiction on the display or playing on speakers, of capture information from the time based stream of information being acquired, process information useful in the editing process to produce the presentation, control elements, etc. Means for presenting the capture information, process information and control elements are provided.

The present invention additionally involves at least one and usually a plurality of control elements 72, e.g. objects, that may be visible (as shown in FIG. 2) or invisible to the display. Control elements may be used to control the capture process or edit process. Control elements allow a user to manipulate and design a presentation or otherwise control it. The controls may be activated by the user or by other means, such as by software instructions, to create control commands. A user may activate control elements through input/output device 92. Input/output devices useful in activating control elements are keyboards, mouses, other cursor pointing devices, microphone, etc.

The control elements respond to activation by sending instructions to the processor. For example, a processing control element conveys directions to the processor regarding how a clip is to be treated or displayed. Each control element includes properties that describe how it will react when selected by the user or other means.

The processing system may contain any number of different types of control elements. One set of control elements are output controls 248 that implement how the user chooses to view or listen to the information from the system. Output control elements may direct the showing of the information on the monitor window 246, the playing of information through audio speakers, or output through other convenient devices in communication with the system. There are several types of output controls 248 that may be provided by the processing system.

The output controls 248 may be used to move the play-head (i.e. pointer to indicate the location in the information available for use) to particular sections of the information stored in the storage. One such output control is a play control 250 that directs the system to play or show the information. Other kinds of output controls include a rewind control 252 and a forward control 254. The play-head may be jogged backward by the user depressing the rewind control 252 to shuttle the play-head in reverse direction. The output of information is advanced by the user selecting the forward control 254 during playback to shift forward at faster than the normal play rate, e.g. double the speed. Also provided by the processing system may be a stop control 256 for ceasing the output action and a pause control 258 for temporarily suspending the movement of the information from the system. In practice, the stop control 256 may be selected and then the rewind control 252 or forward control 254 selected to quickly skip forward or backwards through the footage.

In one method of outputting the time based information through the use of output controls, the play control 250 is activated and then the rewind control 252 or forward control 254 chosen to move to a position that is a immediately prior to the appropriate position for capture. The stop control 256 is selected and the play control 250 is reactivated. When the scene of interest is displayed or a particular portion of audio is played, the clip may be edited.

Several additional output controls may also be employed for alternative ways of communicating the information. For example, a full screen mode control 152 may be provided to permit the presentation to be shown in a window that spans the entire area of the display. Also, some control elements may adjust the quality of playback. A preferences option with a playback tab (not shown), and an edit pull down menu 254 are some optional quality controls. In addition, a sound control knob 256 functions to adjust the intensity of audio.

A smooth motion control may be present to allow the user to create a smoother playback than would be typically expected. Usually, the bandwidth necessary to display digital video requires that visual quality be compromised in order to deliver a high number of frames per second (fps) during playback. Also, a better image control may be included to provide a crisper playback and more detail from each frame displayed. Such option for a better image is often at the expense of motion quality. The number of frames per second that may be displayed is dependent on the processing power of the system, where higher power results in higher frame rate and less choppy playback.

Some forms of control elements that are visible on the screen are buttons, "pop-up" or pull-down menus, scroll bars and iconic images. Other control elements may be invisible to the screen and thus are not included on the GUI. There are a variety of interactive mechanisms to activate the control elements, such as keyboard input, voice command, mouse manipulation, text entry, pen-to-text data entry device, touch screen, network signals, satellite transmissions, preprogrammed triggers within the system, instructional input from other applications, etc. All of the control elements described herein are by way of example and are not intended to limit the choices that are or may become available in the art.

Other control elements are not visible on the screen but may be present on input/output devices, such as a keyboard that is in communication with the I/O control. For example, a space bar on a keyboard may also be depressed to start capture and depressed again to stop capture of the information on the fly while playing the time based information during capture mode.

The table shown below describes other control elements that may be present on the keyboard, where the items in the "action" column describe the command activated by depressing the keyboard button and the items in the "shortcut" column are the corresponding keyboard buttons.

| Keyboard shortcuts Navigation | |
|---|---|
| Action | Shortcut |
| Play/Stop and Start/Stop Capture | Space Bar |
| Play-head to Beginning of Movie | Home |
| Play-head to End of Movie | End |
| Forward One Frame | Right Arrow |
| Forward Ten Frames | Shift + Right Arrow |
| Roll Play-head Forward | Hold Down Right Arrow |
| Search Forward (fforward) | Command + ] |
| Back One Frame | Left Arrow |
| Back Ten Frames | Shift + Left Arrow |
| Roll Play-head Backward | Hold Down Left Arrow |
| Search Backward (rewind) | Command + [ |
| Selection | |
| Multiple Selection | Shift + Click Item |
| Multiple Selection (range) | Click 1st item then Shift + Click last item |

| -continued | |
|---|---|
| Keyboard shortcuts Navigation | |
| Action | Shortcut |
| Moving/Cropping | |
| Move Audio Clip | Click Clip + Left or Right Arrow |
| Move Audio Clip Ten Frames | Click Clip, then Shift + Left or Right Arrow |
| Move Crop Marker | Click Marker + Left or Right Arrow |
| Move Crop Marker Ten Frames | Click Marker, then Shift + Left or Right Arrow |
| Accept/Cancel | |
| Accept Dialogs (OK) | Return |
| Cancel Dialogs | Esc or Command + C |
| Cancel Rendering | Command + . (period) |
| Volume | |
| Increase System Volume | Up Arrow |
| Decrease System Volume | Down Arrow |
| Titling | |
| Move Between Text Fields | Tab |
| File Menu Functions | |
| New Project | Command + N |
| Open Project | Command + O |
| Save Project | Command + S |
| Export Movie | Command + E |
| Save Frame As | Command + F |
| Import File | Command + I |
| Quit | Command + Q |
| Edit Menu Functions | |
| Undo | Command + Z |
| Redo | Shift + Command + Z |
| Cut | Command + X |
| Copy | Command + C |
| Paste | Command + V |
| Crop | Command + K |
| Split Clip at Play-head | Command + T |
| Select All | Command + A |
| Select None | Command + D |
| Help Menu Functions | |
| Imovie Help | Command + ? or Help key |

The visible control elements as well as other editing data may be depicted on a graphical user interface (GUI) on the display. An exemplary GUI 230 for displaying various data related to both the capture of the information and processing of the information is depicted variously in FIGS. 6A to 6C. The GUI has numerous innovations that allow a user to easily make edits and create a presentation.

Figure 6A:
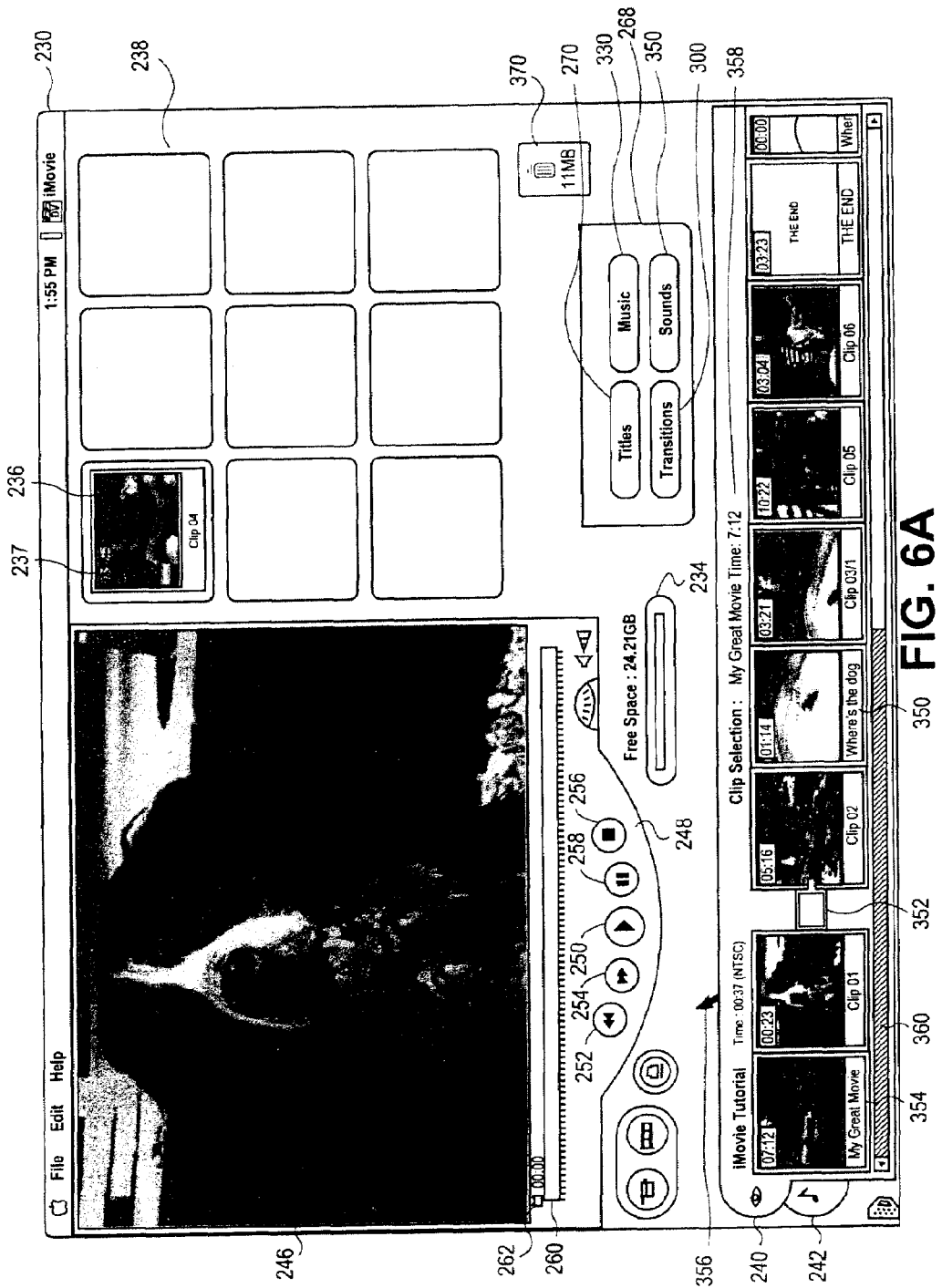

As shown in FIG. 6A, the process information displayed on the GUI 230 may include at least one object reference element 236, e.g. icon, with each reference element 236 being associated with a reference in storage that has data for a clip of the time based information contained in storage 30. Typically, the reference element 236 is displayed as a "thumbnail" in the form of a still image of the first frame of the associated clip. Where the reference has an edit feature, a description or depiction of the edit feature may also be included. Some reference having edit features may have a thumbnail image associated with the corresponding clip and along with a portrayal of the edit feature 350. Other edit features may have a particular shape, size or texture to indicate the edit feature. For example, a reference to a transition may be in the form of a box 352.

The process information may also include an edit output to reveal stored clips of the time based information for processing/editing during an edit mode. The edit output may depict how the clips would appear in presentation after editing is complete. For example, the user may desire to modify a clip, such as add a title or transition to a clip, via a reference with an edit feature. The user may observe the edit output of the clip with the selected title or transition and the user may choose to accept or reject the modification.

Typically, one or more windows are present in the GUI, which may be opened by processor 24 or by the user. One such user interface illustrated in FIG. 6A has several windows, such as a monitor window 246, time line 240 and edit box 268. The monitor window 246 may be the viewing portion of the display that shows the edit output. Various other windows may be present on the display of the processing system to provide at least one control element.

The user may input commands to relocate reference elements 236 to the several windows and portions on the GUI, such as a shelf 238, a video time line 240, an audio time line 242 or other portion of the display, in order to manipulate the references in forming segments of a presentation. By selecting the reference element(s) or portion thereof, and employing other process information, the reference element or portions of reference elements, may be moved around the GUI 230 and edited. One typical way for a user to select a reference element is by pointing a cursor on the reference element and clicking on it, such as via a mouse or keyboard stroke. However, a user may use other tools for selection such as menu choices, voice instructions, etc. A selected reference may be indicated on the GUI by a highlighted border 354 around the reference.

In one embodiment, a reference element is moved to various portions of the display by moving a pointer 356, e.g. cursor, over the reference element and dragging the reference element to another portion of the display. The reference element is dropped over the intended spot on the GUI by releasing the pointer from the reference element.

Another means to move a reference element is though a cut and paste command. The reference element is selected and is made to disappear from the screen by activating a cut command. Activation of the cut command may occur by the user choosing a menu option, keyboard stroke, etc. An intended place for the relocation is selected and a paste command activated to prompt the reference element to reappear in the selected place.

In addition, other functionalities may be provided by the processing system to relocate the reference element on the GUI, such as mouse clicks, keyboard commands, menu options, various types of control elements, etc.

Other process information displayed on the GUI 230 may also include at least one control element for the user to manipulate the time based information and construct a presentation, at least one time line that represents the edited presentation, such as a graphical representation of a visual time line 240 and a graphical representation of an audio time line 242, and other elements that add convenience to the edit process.

The reference to each clip that is to be included in the presentation is positioned in the presentation by arranging the reference element(s) along a visual time line 240 in the order that the associated information will appear in the presentation. The visual time line 240 is for adding visual information, such as the time based stream of information in the form of full motion images, e.g. video and movies, motion graphics, e.g. animation, as well as still images, e.g. text, pictures, combinations thereof, and the like. The audio time line 242 is for including audio information, such as music, sound effects, and voice/narration, etc. to the presentation. The data corresponding to the time line is stored in presentation storage area within the system.

According to the present invention, the processing system includes functionality to display and use only a single visual time line 240 which is capable of handling any type of edit feature and other visual information. Thus, the one time line may include visual reference elements with any combination of the edit features to be included in the presentation. Where it is desired for an edit feature it be nested in another reference (i.e. clip), the reference element is split into two reference elements and the reference element having the edit feature is positioned between the two on the time line. A time code 237 may be provided that indicates the length of a clip associated with the reference. Furthermore, the time line may include the total time 358 of the presentation. The time line also may have a scroll bar 360 to move up and down the length of the time line, so that the time line is not limited by the space provided by the display. This limit of one visual time line simplifies the GUI, allows for easy interpretation of the edits made to the presentation, conserves storage space (that may be otherwise squandered on several visual time lines for various edit features) and spares the GUI of wasted areas, and other such benefits.

At any time during the edit process, the clip associated with a reference element may be viewed on a monitor window 246. To view the information, a reference element may be selected and dragged/dropped or cut/pasted onto the monitor window. However, such these actions do not necessarily result in the reference element being removed from its current place on the GUI, but simply allow the information to appear on the monitor window.

A monitor window time ruler 260 depicts where the play-head 262 as it travels along the course of the clip. A variety of output controls 248 may be used to move the play-head to various positions on the clip. When the play-head is at the frame of interest, the pause control 258 may be activated and the frame edited. In this manner, particular portions of information may be selected by the user and the system may be further instructed to edit the selected portion, e.g. deleting the selected portion from storage.

Edit features may be conveniently added by use of an edit box 268 that includes various editing control options, such as titles control 270, transitions control 300, music control 330 and sound control 350. Specific sub-windows having edit controls may be included for the various edit features contained in the edit box. The sub-windows may pop-up on the GUI by activating, e.g. by a mouse click, one of the edit control options. The sub-windows may also be retrieved by selecting an existing reference that has an edit feature. Upon selecting such as reference, the sub-window to its edit feature automatically appears on the screen and is ready for further editing. These pop-up windows save screen space and create an easy editing environment for the user.

Figure 6B:
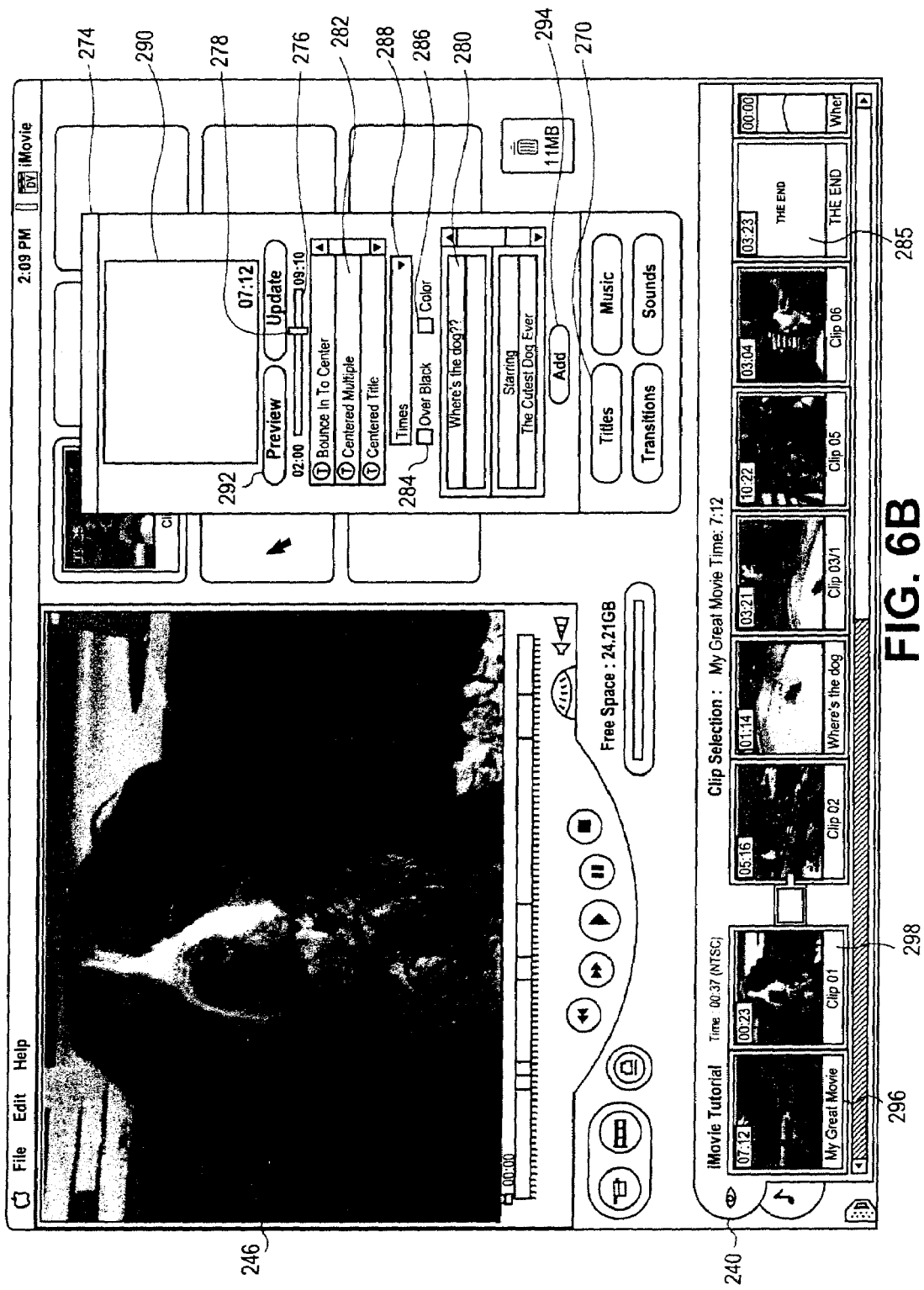

Title control 270 includes instructions for adding text, such as headings, labels or captions, to a clip. Selection of the title control 270 opens a title window 274 as shown in FIG. 6B. A transition time ruler 276 shows the length of the selected clip and the position of the play-head 278. The user may navigate the play-head to various frames in the clip by positioning a cursor over the play-head by use of a mouse, or using other cursor positioning means. The mouse may be used by clicking and holding down on it and sliding the mouse to the left or right along the title time-line relative to the desired location of the play-head.

The title window 274 also includes one or more text field 280 for creating text to be inserted in the clip. A position menu 282 permits the user to choose where and how the text is to appear on the frame. For example, the text may be a centered title, appear to bounce through the length of the frame, centered with multiple text lines, centered as a title, letters flying across the frame, words flying, music video, rolling center credits, rolling credits, scroll with a pause, scrolling as a block, typewriter, and the like. A font menu 288 may be used to dictate the character type. An "over black" control 284 is used to insert an additional black frame at the play-head position and the title over the black frame. An example of a reference element with text over black 285, having the title, "THE END" is shown on time line 240. On the other hand, a "color" control 286 may be used to overlay the text over the current frame. The text may be shown in a preview window 290 by selecting a preview control 292. Preview simulates the edited reference without the edited version being actually saved in storage. An add control 294 is for storing the reference with the title. The reference with edit feature 296 may then be shown on the monitor window 246. The initial clip 01 may be split into the reference with edit feature 296 and remaining portion reference 298, as shown on video time line 240.

Figure 6C:
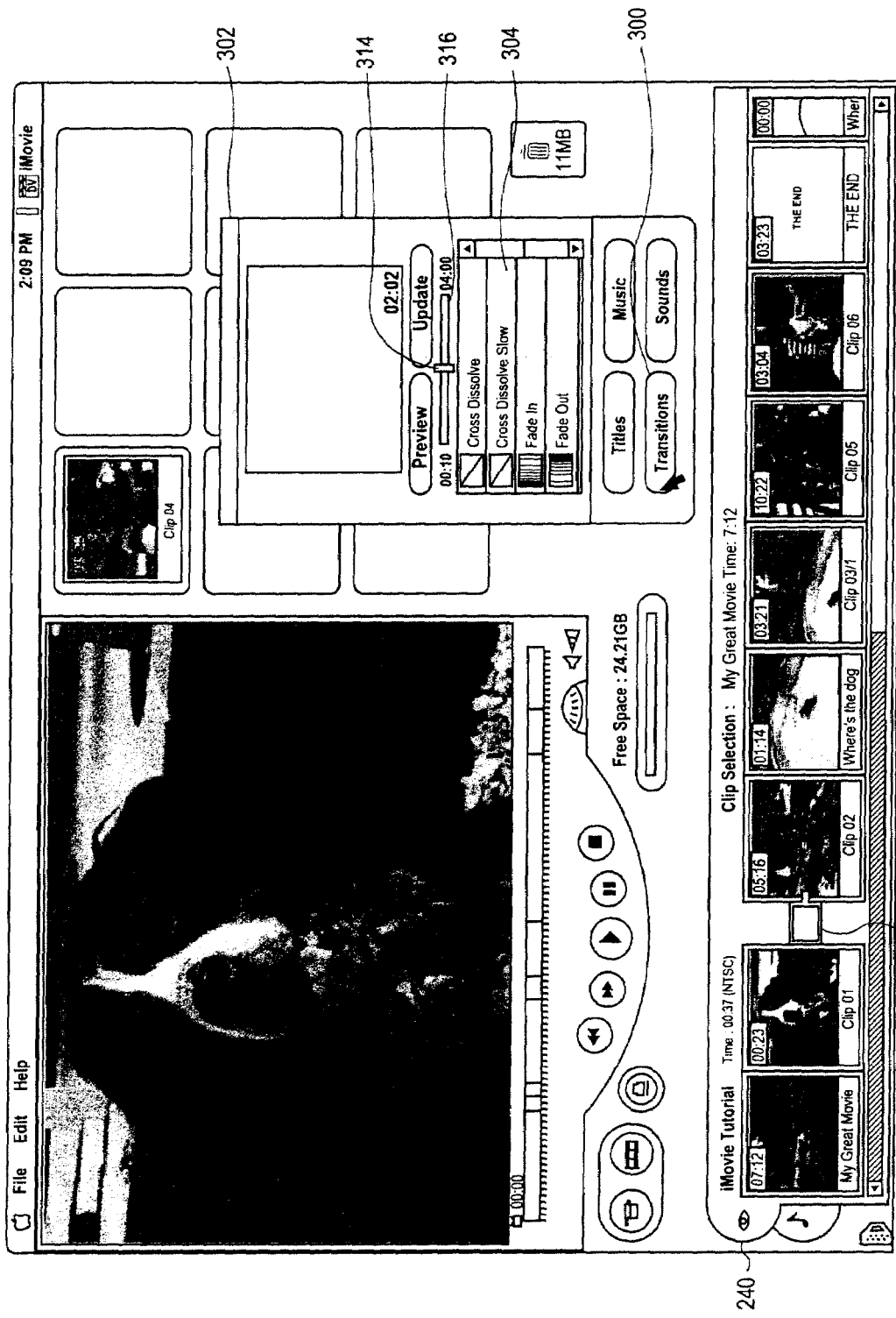

A transition control 300 has instructions for inserting an effect between clips, where selection of the transition control 300 opens a transition window 302, as depicted in FIG. 6C. A transition effects menu 304 permits the user to choose from any one of numerous transition options. Examples of transitions are cross dissolve, cross dissolve slow, fade in, fade out, overlap, push right, slowly push right, scale down, slowly scale down, and the like. The frame location of the play-head 314 along transition time ruler 316 may be positioned by the same or similar manner as described above for introducing titles in a clip. The transition is typically inserted as a frame immediately after the play-head position by reference element with transition 352 and then appears on visual time line 240.

Furthermore, edit box 268 shown in FIG. 6A includes music control 330 for incorporating music tracks to the presentation where the music may be recorded by controls in the music control window. Sound control 350 in the edit box 268 is for including sound effect to portions of the presentation. Usually, the sound effects are prerecorded and stored within the processing system. Some examples of sounds are cat meow, dog bark, crickets, crowd applause, trumpets fanfare, wild laugh, water lapping, whistle, thunder, horn honk and footsteps.

During the edit process, the user may make use of the tools described above in a variety of ways to form the desired presentation. Typically, references are selected, viewed, optionally modified with edit features and transferred to a position on the time line, such as by drag/drop or cut/paste mechanisms. For example, a reference may be selected from the monitor window of an edit sub-window and either cut and pasted into the time line or dragged from the monitor window and dropped into the time line. At any time, particular references may be removed from the presentation and returned to the shelf, also through the drag and drop or cut and paste tools. Where a reference is removed, the references remaining in the presentation shift over in the time line to create a seamless continuation of the presentation.

In addition, where a user does not need a segment of information for the presentation, a clip or portion of a clip may be removed from storage. Entire clips or portions of clips may be deleted by selecting the reference data and dragging it to the trash icon control 370. After depositing the reference data in the trash, the user may activate a delete control. For example, the user may select an "empty trash" e.g. from a pull down menu. In still other embodiments, the user may activate a "cut" command, e.g. from a pull down menu, to have the selected data placed on a paste board. The user may then send delete instructions to the processing system and the data as well as corresponding information is deleted. In another embodiment, an intermediary trash bin or paste board is not used and the user simply elects to delete selected reference data. Other methods for the user to send selection, deletion and trash commands are also possible and intended by the present invention.

The presentation, as edited, may be saved in a variety of formats, such as a QuickTime file or other formats suitable for transfer via e-mail, web pages, CD-ROM, etc. The presentation may be accessed at a later time for additional editing or may be transferred from the processing system, such as conveyed to an external player.

The capture information presented on the GUI is related to the time based information being acquired by the system while in capture mode. The capture information may include a depiction or replay of the time based stream of information (referred to as a "capture output"), as well as other characteristics of the information that is being acquired. The capture output sets forth the current frames that are being received and read, such as newly acquired information that is present in a proxy, i.e. buffer, prior to being written into storage. During the capture mode, the monitor window 246 may exhibit the capture output of the time based information. In addition to showing the capture output, the monitor window 246 may depict the edit output, usually where the capture output is shown while the information is acquired and the edit output is shown while editing the presentation. By this dual use of the monitor window, the screen area is conserved and the user interface is simplified.

A time code 237 may also be provided as capture information to indicate the length of a clip. In addition, the capture information may include an audio synch time line 242 on which references to clips 236 are arranged and depicted in size according to the length of the clip in storage for use in adding audio portions to a presentation. A user may opt for the audio synch time line to automatically display the references for each incoming stream of information. For example, the user may choose a preferences control from a menu and select to have the references appear in the audio synch time line rather than the shelf portion of the user interface. The capture information may further include a space monitor element 234 to show the amount of storage space remaining or amount of space consumed by stored information. Capture information may also include tools, e.g. control elements, for controlling the capture process.

The present invention frequently has a single GUI to display enabled, i.e. operable, capture information and enabled, i.e. operable, process information. Such a GUI is functional for both capture and edit procedures, thus avoiding the necessity of switching to multiple GUI's to view and work with information relating to capture and information relating to the processing of the presentation. Any convenient portions of the screen may be used to show the capture and process information without the user needing to toggle between screens. In one instance, a portion of the display provides capture information, such as the capture output, and another portion of the display contains process information. An example of this embodiment is where capture information is shown in a window on the display, and process information in at least one other window on the display. In the alternative, the same portion of the display may be used to show capture information and process information at different times. In one such embodiment, a capture output may be presented on a viewing portion of the display during capture of the time based information and an edit output may be presented on the same viewing portion during editing of the presentation.

In addition to the features described above, the processing system may further include alternative aspects that enhance ease and convenience of use. For example, referring again to FIG. 2, the information source 80 may be controlled through the processing system 12. Source controls operate the information source 80, usually where no digital converter 82 is employed as an intermediate between the information source and processing system. The source controls may be presented on the GUI. In one embodiment, the output controls 248, as shown in FIG. 6A also serve as the source controls to direct the monitor window views at one time and send action commands to the information source 80 at another time. Thus, the source controls may include rewind control 252, forward control 254, play control 250, pause control 258 and stop control 256.

Software Overview

Figure 7:
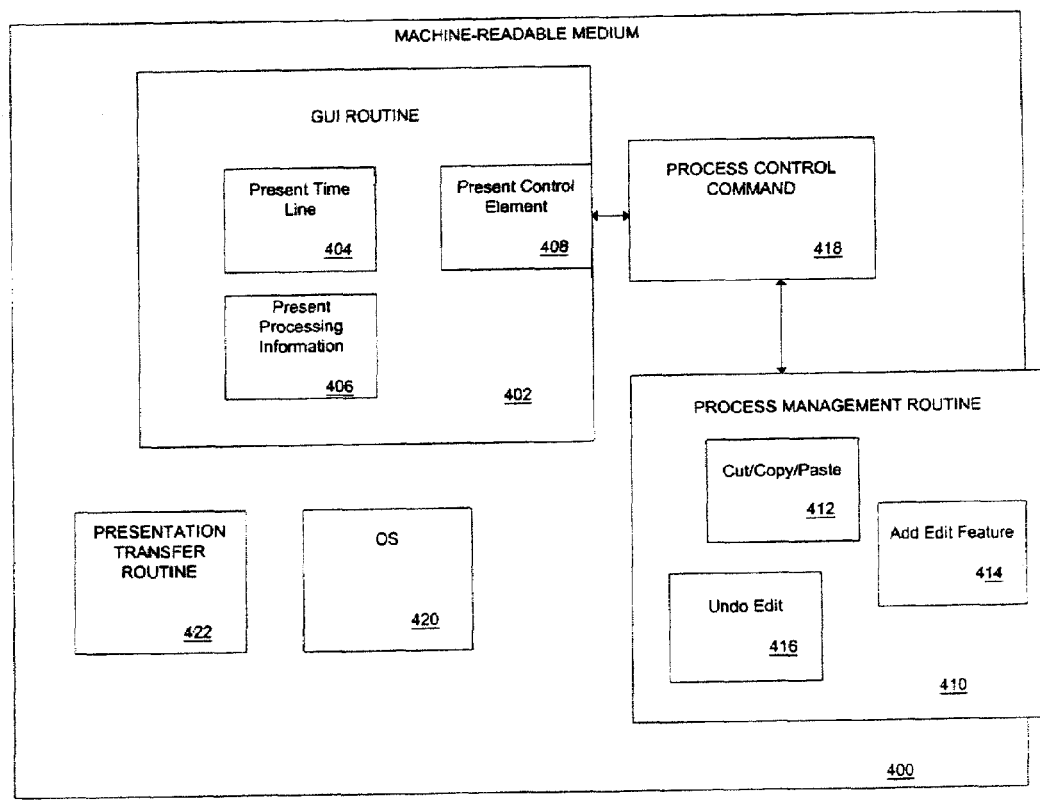
FIG. 7 is a block diagram of a machine-readable medium storing executable code and/or other data to provide one or a combination of mechanisms for processing a time based stream of information, configured in accordance with one embodiment of the present invention.

Various software components may be provided within or in communication with the system that cause the processor to execute the numerous methods employed in creating the presentation. FIG. 7 is a block diagram of a machine-readable medium storing executable code and/or other data to provide one or a combination of mechanisms for manipulating the time based stream of information, according to one embodiment of the invention. The machine-readable storage medium 400 represents one or a combination of various types of media/devices for storing machine-readable data, which may include machine-executable code or routines. As such, the machine-readable storage medium 400 could include, but is not limited to one or a combination of a magnetic storage space, magneto-optical storage, tape, optical storage, dynamic random access memory, static RAM, flash memory, etc.

The machine readable storage medium 400 is shown storing a GUI routine 402, which, when executed, provides a GUI for display of capture and process information regarding the time based stream of information, such as the GUI 230 shown in FIGS. 6A-6C. The GUI routine 402 includes a number of mechanisms for playing or otherwise processing the time based stream of information. For example, a show visual time line routine 404 provides the time line representation of the presentation storage area and references placed therein, as described with regards to FIGS. 6A-6C. A present process information routine 406 provides process information and present control elements 408 permits control elements to be visible on the display.

The medium 400 also has a process control command routine 418 that directs the carrying out of various commands, such as for manipulating information and constructing a presentation. The control commands may be generated by activation of control elements by the user. Upon receipt of the control commands, the process control command 418 may send instructions to the GUI Routine 402 to specify particular information to be presented or manner of presenting information. The process control command 418 routine may also send the commands to a process management routine, such as an add edit feature command, undo command, delete command, select information command, cancel delete command, and the like, as described below.

The medium also has a process management routine 410 that may have various subroutines for conducting various tasks related to editing and carrying out instructions from the process control command routine 418. One such subroutine is a cut/copy/paste subroutine 412, which when executed, references or portions thereof are cut, copied and/or pasted into a presentation. The process management routine 410 may be also configured for conducting an add edit feature subroutine 416 to include particular edit features to references for use in a presentation. An undo edit subroutine 414 may optionally be included whereby certain edit tasks may be undone to reclaim the unmodified version of data Other software components may include an operating system 420 and a presentation transfer routine 422 that facilitates communication of information from the processing system, such as via external player 84. Various modes of transfer are described above with reference to the external player 84 in FIG. 2.

The software components may be provided in as a series of computer readable instructions that may be embodied as data signals in a carrier wave. When the instructions are executed, they cause a processor, such as through a browser to perform the capture and editing steps as described. For example, the instructions may cause a processor to communicate with an information source, provide capture information from the time based stream of information on a first portion of a display, provide process information for constructing the presentation on a second portion of the display; and provide at least one enabled control element. Such instructions may be presented to the processor by various mechanisms, such as a plug-in, ActiveX control, through use of an applications service provided or a network, etc.

The present invention has been described above in varied detail by reference to particular embodiments and figures. However, these specifics should not be construed as limitations on the scope of the invention, but merely as illustrations of some of the presently preferred embodiments. It is to be further understood that other modifications or substitutions may be made to the described information transfer system as well as methods of its use without departing from the broad scope of the invention. Therefore, the following claims and their legal equivalents should determine the scope of the invention.

What is claimed is:

1. A method for processing a presentation of a time based stream of information, the method comprising:

A) providing a user interface having functionality to display on a screen only a single graphical representation of a time line, the time line including a video time line and an audio time line overlapped with each other and synchronized in time, wherein the video time line is selectable via a video selection tab and the audio time line is selectable via an audio selection tab different than the video selection tab, wherein when the video selection tab is activated the video time line is displayed without displaying the audio timeline, wherein when the audio selection tab is activated, the audio time line is displayed overlaying the video time line such that only the audio time line is displayed without showing the video time line while the audio and video time lines are still synchronized in time, wherein the single graphical representation of the video time line includes a plurality of references, each reference corresponding to a visual time based stream of information, each reference including one of at least two types of edit features, each edit feature including a description, wherein at least two of the references are to be positioned in a presentation, wherein any time instant along the time line corresponds to at most one of the references positioned in the presentation, and wherein each reference is displayed in a form of a still image of a frame in the corresponding visual time based stream of information;
B) displaying the single graphical representation of the time line on the screen according to the user interface;
C) displaying a reference with an edit feature on the screen according to the user interface; and
D) dragging the reference over the single graphical representation of the time line to insert the edit feature into the presentation.

2. The method of claim 1, wherein the edit feature is text.

3. The method of claim 1, wherein the edit feature is a transition.

4. The method of claim 1, wherein the single graphical representation of the time line includes at least two references and wherein the reference with an edit feature is dragged between the two references.

5. The method of claim 1, wherein providing the reference with the edit feature is by moving a reference to an edit box and inserting the edit feature into the reference in response to user edit commands.

6. The method of claim 5, wherein the moving of the reference is by cutting the reference and pasting the reference over the edit box.

7. The method of claim 1, further including editing the edit feature of the reference by selecting the reference and popping up an edit box automatically in response to the selecting.

8. The method of claim 1, further including displaying another reference having an edit feature and in response to a user cut/paste command, cutting the other reference from a position on the user interface and pasting the other reference over the single graphical representation of the time line to insert the edit feature into the presentation.

9. The method of claim 8, wherein the single graphical representation of the time line includes at least two references and wherein the reference having an edit feature is pasted between the two references.

10. The method of claim 1, wherein the presentation includes a selector, the selector to cause the user interface to display a second single graphical representation of a second time line when selected, and wherein any time instant along the time line corresponds to one instant along the second time line.

11. The method of claim 10, wherein the time line is a video time line.

12. The method of claim 10, wherein the time line is an audio time line.

13. A digital processing system comprising:
a processor; and
a memory coupled to the processor for storing instructions, which when executed from the memory, cause the processor to perform processing a presentation of a time line, the processing providing a user interface having functionality to display on a screen only a single graphical representation of the time line, the time line including a video time line and an audio time line overlapped with each other and synchronized in time, wherein the video time line is selectable via a video selection tab and the audio time line is selectable via an audio selection tab different than the video selection tab, wherein when the video selection tab is activated, the video time line is displayed without displaying the audio timeline, wherein when the audio selection tab is activated, the audio time line is displayed overlaying the video time line such that only the audio time line is displayed without showing the video time line while the audio and video time lines are still synchronized in time, wherein the single graphical representation of the video time line includes a plurality of references, each reference corresponding to a visual time based stream of information, each reference including one of at least two types of edit features, each edit feature including a description, wherein at least two of the references are to be positioned in a presentation, wherein any time instant along the time line corresponds to at most one of the references positioned in the presentation, wherein each reference is displayed in a form of a still image of a frame in the corresponding visual time based stream of information, the processing displaying the single graphical representation of the time line on the screen according to the user interface, the processing displaying a reference with an edit feature on the screen according to the user interface, and the processing dragging the reference over the single graphical representation of the time line to insert the edit feature into the presentation.

14. The system of claim 13, wherein the edit feature is text.

15. The system of claim 13, wherein the single graphical representation of the time line includes at least two references and wherein the reference with an edit feature is dragged between the two references.

16. The system of claim 13, wherein the providing the reference with the edit feature is by moving a reference to an edit box and inserting the edit feature into the reference in response to user edit commands.

17. The system of claim 16, wherein the moving of the reference is by cutting the reference and pasting the reference over the edit box.

18. The system of claim 13, further including editing the edit feature of the reference by selecting the reference and popping up an edit box automatically in response to the selecting.

19. The system of claim 13, wherein the presentation includes a selector, the selector to cause the user interface to display a second single graphical representation of a second time line when selected, and wherein any time instant along the time line corresponds to one instant along the second time line.

20. The system of claim 19, wherein the time line is a video time line.

21. A processing system for generating a presentation of a time-based stream of information comprising:
A) means for providing a user interface having functionality to display on a screen only a single graphical representation of a time line, the time line including a video time line and an audio time line overlapped with each other and synchronized in time, wherein the video time line is selectable via a video selection tab and the audio time line is selectable via an audio selection tab different than the video selection tab, wherein when the video selection tab is activated, the video time line is displayed without displaying the audio timeline, wherein when the audio selection tab is activated, the audio time line is displayed overlaying the video time line such that only the audio time line is displayed without showing the video time line while the audio and video time lines are still synchronized in time, wherein the single graphical representation of the video time line including a plurality of references, each reference corresponding to a visual time based stream of information, each reference including one of at least two types of edit features, each edit feature including a description, wherein at least two of the references are to be positioned in a presentation, wherein any time instant along the time line corresponds to at most one of the plurality of references positioned in the presentation, and wherein each reference is displayed in a form of a still image of a frame in the corresponding visual time based stream of information;

B) means for displaying the single graphical representation of a time line on the screen according to the user interface;

C) means for displaying a reference with an edit feature on the screen according to the user interface; and D) means for dragging the reference over the single graphical representation of the time line to insert the edit feature into the presentation.

22. The system of claim 21, wherein the edit feature is text.

23. The system of claim 21, wherein the single graphical representation of the time line includes at least two references and wherein the reference with an edit feature is dragged between the two references.

24. The system of claim 21, wherein the providing the reference with the edit feature is by moving a reference to an edit box and inserting the edit feature into the reference in response to user edit commands.

25. The system of claim 24, wherein the moving of the reference is by cutting the reference and pasting the reference over the edit box.

26. The system of claim 21, further including means for editing the edit feature of the reference by selecting the reference and popping up an edit box automatically in response to the selecting.

27. A computer readable storage medium having stored therein a plurality of sequences of executable instructions, which, when executed by a processing system for collecting a time based stream of information and generating a presentation, cause the processing system to:

A) provide a user interface having functionality to display on a screen only a single graphical representation of a time line, the time line including a video time line and an audio time line overlapped with each other and synchronized in time, wherein the video time line is selectable via a video selection tab and the audio time line is selectable via an audio selection tab different than the video selection tab, wherein when the video selection tab is activated, the video time line is displayed without displaying the audio timeline, wherein when the audio selection tab is activated, the audio time line is displayed overlaying the video time line such that only the audio time line is displayed without showing the video time line while the audio and video time lines are still synchronized in time, wherein the single graphical representation of the video time line includes a plurality of references, each reference corresponding to a visual time based stream of information, each reference including one of at least two types of edit features, each edit feature including a description, wherein at least two of the references are to be positioned in a presentation, wherein any time instant along the time line corresponds to at most one of the references positioned in the presentation, and wherein each reference is displayed in a form of a still image of a frame in the corresponding visual time based stream of information;

B) display the single graphical representation of the time line on the screen according to the user interface;

C) display a reference with an edit feature on the screen according to the user interface; and D) drag the reference over the single graphical representation of the time line to insert the edit feature into the presentation.

28. The computer readable storage medium of claim 27, wherein the edit feature is text.

29. The computer readable storage medium of claim 27, wherein the single graphical representation of the time line includes at least two references and wherein the reference with an edit feature is dragged between the two references.

30. The computer readable storage medium of claim 27, wherein the providing the reference with the edit feature is by moving a reference to an edit box and inserting the edit feature into the reference in response to user edit commands.

31. The computer readable storage medium of claim 30, wherein the moving of the reference is by cutting the reference and pasting the reference over the edit box.

32. The computer readable storage medium of claim 27, further including additional sequences of executable instructions, which, when executed by the processing system, cause the processing system to edit the edit feature of the reference by selecting the reference and pop up an edit box automatically in response to the selecting.

33. The computer readable storage medium of claim 27, wherein the presentation includes a selector, the selector to cause the user interface to display a second single graphical representation of a second time line when selected, and wherein any time instant along the time line corresponds to one instant along the second time line.

34. The computer readable storage medium of claim 33, wherein the time line is an audio time line.

35. A processing system for generating a presentation of a time-based stream of information comprising:

A) means for providing a user interface having functionality to display only a single graphical representation of a time line, the time line including a video time line and an audio time line overlapped with each other and synchronized in time, wherein the video time line is selectable via a video selection tab and the audio time line is selectable via an audio selection tab different than the video selection tab, wherein when the video selection tab is activated, the video time line is displayed without displaying the audio timeline, wherein when the audio selection tab is activated, the audio time line is displayed overlaying the video time line such that only the audio time line is displayed without showing the video time line while the audio and video time lines are still synchronized in time, wherein the single graphical representation of the video time line includes a plurality of references, each reference corresponding to a visual time based stream of information, each reference including one of at least two types of edit features, each edit feature including a description, wherein at least two of the references are to be positioned in a presentation, wherein any time instant along the time line corresponds to at most one of the references positioned in the presentation, and wherein each reference is displayed in a form of a still image of a frame in the corresponding visual time based stream of information;

B) means for displaying the single graphical representation of the time line on the screen according to the user interface;

C) means for displaying a reference having an edit feature on the screen according to the user interface; and D) means for cutting the reference from a position on the user interface and pasting the other reference over the single graphical representation of the time line to insert the edit feature into the presentation.

36. The system of claim 35, wherein the edit feature is text.

37. The system of claim 35, wherein the edit feature is a transition.

38. The system of claim 35, wherein the single graphical representation of the time line includes at least two references and wherein the reference with an edit feature is dragged between the two references.

39. The system of claim 35, wherein means for providing the reference with the edit feature is by cutting and pasting a reference to an edit box and inserting the edit feature into the reference in response to user edit commands.

40. The system of claim 35, further including means for editing the edit feature of the reference by selecting the reference and popping up an edit box automatically in response to the selecting.

41. The system of claim 35, wherein the presentation includes a selector, the selector to cause the user interface to display a second single graphical representation of a second time line when selected, and wherein any time instant along the time line corresponds to one instant along the second time line.

42. The system of claim 41, wherein the time line is a video time line.

* * * * *